May 24, 1949.    I. NEUSTADTER    2,471,344
LINGUAL MOLD BAR FOR DENTAL MOLDS
Filed May 29, 1948    2 Sheets-Sheet 1
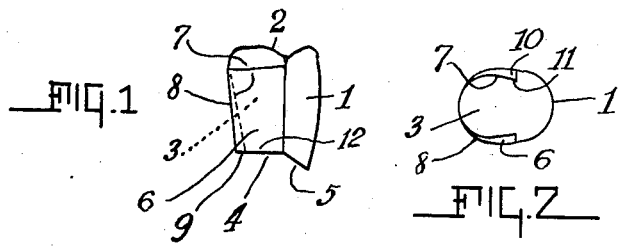
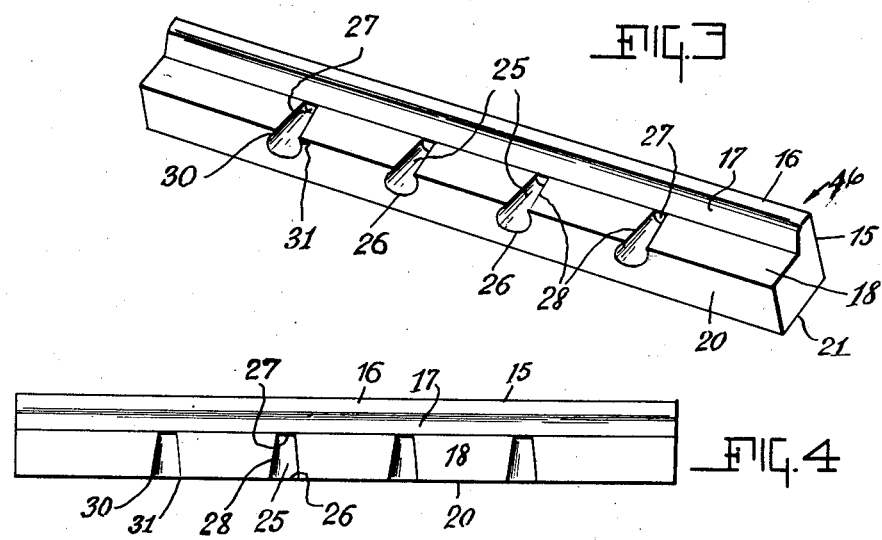
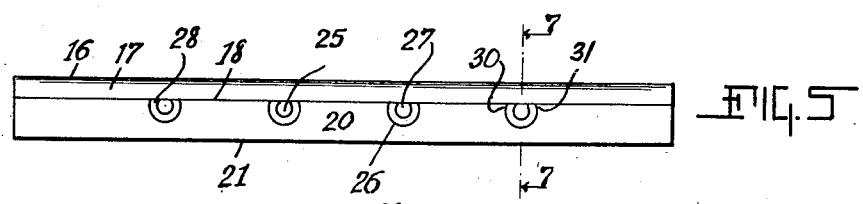
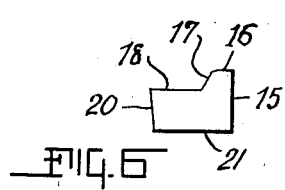
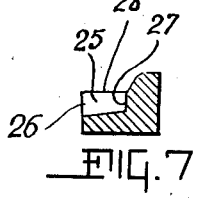
INVENTOR.
IRVING NEUSTADTER
BY May 24, 1949.  I. NEUSTADTER  2,471,344
LINGUAL MOLD BAR FOR DENTAL MOLDS
Filed May 29, 1948  2 Sheets-Sheet 2
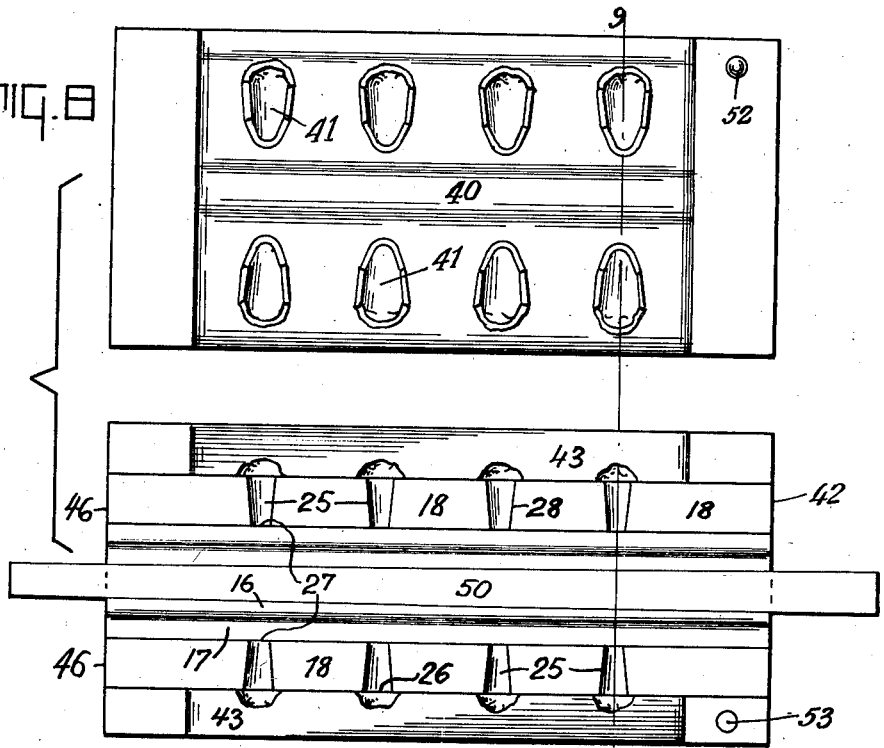
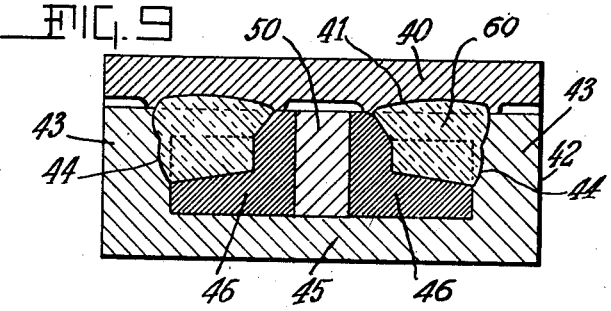
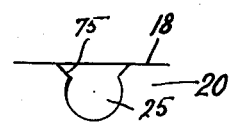
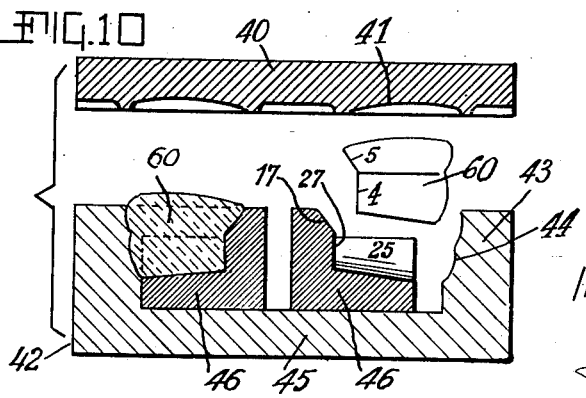
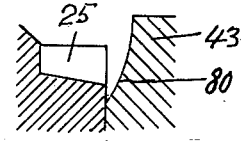
INVENTOR.
IRVING NEUSTADTER
BY Patented May 24, 1949

2,471,344

UNITED STATES PATENT OFFICE 2,471,344

LINGUAL MOLD BAR FOR DENTAL MOLDS

Irving Neustadter, Brooklyn, N. Y.

Application May 29, 1948, Serial No. 30,011

2 Claims. (Cl. 18—34.1)

The object of this invention is to provide a mold for manufacturing artificial teeth of the types disclosed in my two pending applications, Ser. No. 661,805, filed April 12, 1946, and Ser. No. 742,269, filed April 18, 1947, and artificial teeth of other like types. The artificial teeth disclosed in the two applications are characterized by having peg shaped or tapered lingual portions extending from the crown downward to the root. Circumferentially the taper extends forwardly to the labial portion of the tooth where angular indentations are formed between the wall of the taper and the wall of the labial portion. The teeth in said applications are designed to form parts of prefabricated dental units, a unit consisting of a tooth and a metal band which encloses the lingual portion. The band serves for mounting the unit in a dental restoration and also prevents removal of the tooth from the band except in an upward or downward direction depending upon whether the tooth is a lower or an upper tooth. Hence the forward ends of the metal band are turned towards each other and are closer together than the widest mesial-distal dimension of the tooth. The lingual portion of the tooth is so shaped and dimensioned that all teeth of the same shape and size have the same size lingual portion.

In order to manufacture a tooth having the described shape it is necessary that the lingual cavities of the dental mold be exactly alike. The degree of accuracy of the same parts and dimensions of the cavities must be such as cannot be obtained by hand labor. The lingual mold member in which the lingual cavities are formed must likewise be of the utmost accuracy in all dimensions affecting the shape of the tooth.

So far as I know, nobody has heretofore proposed a lingual mold member containing lingual cavities produced in its over-all dimensions by machinery whereby to obtain absolute accuracy of the several cavities and molding portions. I have found a way of producing a lingual mold member manufactured mechanically to insure the production of artificial teeth in which the lingual portions are all exactly alike. The mold member is in the form of a bar which is machined by mechanical tools, the use of which are within the range of the average skilled workman.

My invention, therefore, comprises a dental mold for forming artificial teeth characterized by that the mold includes a lingual mold bar shaped by machinery and provided with a plurality of machined tapered lingual tooth cavities for molding the lingual portions of teeth, said cavities being produced mechanically and therefore all being exactly alike.

In the accompanying drawings

Fig. 1 is a side view of a dental tooth unit of the character disclosed in my two pending applications.

Fig. 2 is a bottom view of Fig. 1.

Fig. 3 is a perspective view of my new mold bar.

Fig. 4 is a top view of the bar.

Fig. 5 is a side view thereof.

Fig. 6 is an end view.

Fig. 7 is a sectional view on the line 7—7 of Fig. 5.

Fig. 8 is a view of a dental mold in open position.

Fig. 9 is an enlarged transverse sectional view of the mold in closed position taken on the line 9—9 of Fig. 8.

Fig. 10 is a similar view showing the mold being opened.

Figs. 11 and 12 show modifications.

Referring to Figs. 1 and 2, the artificial tooth includes the labial portion 1, the crown 2, the tapered lingual portion 3 and the root 4, which also includes the labial root portion 5. The lingual portion 3 is enclosed by a metal band 6 having an inside tapered wall 7, an outside wall 8 and a base 9. The forward ends 10 of the band are turned inwardly and fill angular indentations 11, one on each side. The distance between the band ends 10 is less than the largest mesial-distal dimension of the tooth. The tapered lingual portion of the tooth is perfectly smooth from top to bottom as well as circumferentially. The root surface is preferably at a right angle to the axis of the tooth. This description of the tooth is included for better appreciation of the features of my new lingual mold bar.

Figs. 3–7 illustrate my machine made lingual mold bar 46 which is of an over-all size and shape to be used in a dental mold according to present practice. The bar has a rear side 15 of a height which includes the total dimension fore and aft of the root as will be seen from Fig. 9. From the side 15 two surfaces 16 and 17 extend downwardly and forwardly. The surface 17 controls the formation of the root of the tooth. A third side 18 extends horizontally forwardly and is of width which is equal to the length of the tapered lingual portion of the tooth. The face 20 of the bar is high enough so that the lingual cavities may be bored therein. The base of the bar is numbered 21.

The feature of my lingual mold bar resides in the provision of tapered lingual mold cavities 25 which are spaced along the bar and which are exactly alike in that they are produced by drilling with a tapered drill or reamer applied against the face 20 of the bar, the tool being centered below the side 18.

The cavities 25 have their openings 26 in the face of the bar. Their bottoms or inner ends 27 are at the base of the inclined wall 17 with an axial opening at 28. By selecting boring or reaming drills of the desired taper and dimensions the lingual cavities may be produced all at one time to suit the types and sizes of teeth to be molded. The distance between the points 30 and 31 of the opening 28 which corresponds to the mesial-distal dimension of the tooth may be varied by raising or lowering the boring tool to shift the axis thereof a lesser or greater distance from the side 18. Likewise, the distance between the points 30 and 31 may be increased by lowering the height of the face 20 of the bar. These are obvious matters of importance in modern production practice. The length of the tapered lingual portion 3 of the tooth may be changed by inclining the face 20 with respect to the side 21 toward the side 15 whereby the bottom of the taper, measured axially, may be shortened with respect to the length of the opening 28.

Lingual tapered cavities produced by boring or reaming with a drilling tool are of a necessity exactly alike. The bar itself is produced by machinery quickly and inexpensively.

Fig. 8 shows a dental mold in open position. The top figure is the mold cover 40 having labial tooth cavities 41. The bottom figure shows the base mold member 42 having upright sides 43 with crown cavities 44, Fig. 9. The cavities 41 and 44 are made in accordance with present practice. The sides of the mold are marked 43 and are united to form the base by means of a bottom member 45, Fig. 9. Two of my lingual bars 46 are placed within the mold as shown with the lingual cavities facing the sides 43 of the base 42. The bars 46 are forced into tight engagement with the sides 43 by a wedge bar 50 pushed between the bars. The two parts of the mold are closed with the cavities in registry, one or more pins 52 and holes 53 being used for centering purposes as usual. Only one pin and hole is shown. The formation of the tapered lingual portions and the shaping of the root portions takes place in the mechanically produced cavities 25 in operative cooperation with the mechanically produced inclined wall 17.

Fig. 10 shows how the mold is opened by removing the wedge 50 and lifting the cover from the mold. Then the bars 46 are moved away from the sides 43 and the teeth 60 lifted out.

Fig. 11 shows a modification in which the edges of the openings 28 of the cavities 25 may be bevelled as at 75 with a suitable tool if it is desired to change the formation of the angular indentations 11 shown in Fig. 2. If it is desired to provide a tooth with an overhanging crown, i. e. a crown which extends beyond the tapered lingual portion, the crown cavity 80 in the mold may be shaped accordingly, Fig. 12.

The mold bar 46 is produced mechanically and all the cavities 25 are the result of the operation of tapered drilling tools such as reamers. A straight reamer may of course be used without departing from the scope of the invention in the event a straight, not tapered, lingual portion is desired.

While I have illustrated a posterior tooth in Figs. 1 and 2 and have illustrated and described a machined mold bar for forming the lingual portion of such tooth, it will be clear to persons skilled in the art that my invention is usable and of equal advantage in forming the lingual portions of all anterior teeth, upper and lower.

I claim:

1. A dental mold for molding artificial teeth, said teeth having smooth peg-shaped lingual portions of the character described, said mold being a multi-part mold including two complementary parts having recesses for forming the labial and occlusal portions of the teeth, a machined lingual mold bar in said mold having smooth peg shaped cavities which are exactly alike, said cavities opening into the recesses aforesaid for forming smooth lingual peg shaped portions of the teeth, said lingual mold bar having an upstanding wall extending the length of the bar, said wall having an angularly inclined surface facing said recesses in molding association therewith.

2. In a dental mold for molding artificial teeth, said teeth having lingual portions of peg shaped formation axially of the teeth and of substantially semi-circular formation circumferentially forming an indentation on each side of the tooth behind the labial portion thereof, a lingual mold bar having a plurality of spaced peg-shaped cavities for forming said lingual portions and said indentations, said bar having an upstanding wall extending the length of the bar, said wall having a surface positioned at a right angle to the axes of said cavities to form the bottom of all of them and form therewith spaces for molding the lingual portions of the teeth.

IRVING NEUSTADTER.

REFERENCES CITED

The following references are of record in the file of this patent:

UNITED STATES PATENTS

| Number | Name | Date |
| --- | --- | --- |
| 23,473 | Lewenberg | Apr. 5, 1859 |
| 1,680,312 | Whiteley, Jr. | Aug. 14, 1928 |